(12) United States Patent
Boland et al.

(10) Patent No.: US 11,718,210 B2
(45) Date of Patent: Aug. 8, 2023

(54) VENTILATED SEAT SYSTEM

(71) Applicant: Ford Global Technologies, LLC, Dearborn, MI (US)

(72) Inventors: Brian Boland, Pinckney, MI (US); Michael Steven Medoro, Sunnyvale, CA (US); Andres Almeida Senatore, San Jose, CA (US); Otis Allen, Soquel, CA (US); Dylan Mandelbaum, Mountain View, CA (US); Siddharthan Selvasekar, Livermore, CA (US); Sydney Puckett, Detroit, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 182 days.

(21) Appl. No.: 17/238,868

(22) Filed: Apr. 23, 2021

(65) Prior Publication Data

US 2022/0340057 A1 Oct. 27, 2022

(51) Int. Cl.
*B60N 2/56* (2006.01)
*F04D 29/66* (2006.01)
*B60N 2/20* (2006.01)

(52) U.S. Cl.
CPC ............. *B60N 2/565* (2013.01); *F04D 29/66* (2013.01); *B60N 2/20* (2013.01); *B60N 2/5621* (2013.01); *B60N 2/5671* (2013.01)

(58) Field of Classification Search
CPC .................... B60N 2/5621–5671; F04D 29/66
See application file for complete search history.

(56) References Cited

U.S. PATENT DOCUMENTS

| | | | |
|---|---|---|---|
| 3,863,733 A * | 2/1975 | Raudman, Jr. | ............ F01N 1/00 181/252 |
| 9,096,157 B2 | 8/2015 | Line et al. | |
| 9,759,439 B2 | 9/2017 | Uhlenbusch | |
| 2008/0129090 A1 | 6/2008 | Zeyen et al. | |
| 2019/0337429 A1* | 11/2019 | McElroy | ............. B60N 2/5657 |

(Continued)

FOREIGN PATENT DOCUMENTS

| DE | 4233941 C2 | 10/1996 |
|---|---|---|
| JP | 5029593 B2 | 9/2012 |

OTHER PUBLICATIONS

D'Alessandro, Luca, et al., Shape Optimization of Solid-Air Porous Phononic Crystal Slabs with Widest Full 3D Bandgap for In-Plane Acoustic Waves, Journal of Computational Physics, Science Direct, May 15, 2017, vol. 344, pp. 465-484.

(Continued)

*Primary Examiner* — Syed A Islam
(74) *Attorney, Agent, or Firm* — Vichit Chea; Price Heneveld LLP (57) ABSTRACT

A ventilated seat system for a vehicle includes a seating assembly including a seatback operably coupled to a seat base. A blower is coupled to the seating assembly. The blower generates a sound transmission when activated. The blower includes a housing defining an inlet and an outlet. A first metamaterial silencer is coupled to an interior surface of the housing proximate to the inlet, and a second metamaterial silencer is coupled to the interior surface of the housing proximate to the outlet. Each of the first metamaterial silencer and the second metamaterial silencer reduces the sound transmission generated by the blower.

19 Claims, 7 Drawing Sheets

(56) References Cited

U.S. PATENT DOCUMENTS

2020/0039396 A1    2/2020  Almasi et al.
2020/0122613 A1    4/2020  McElroy et al.
2022/0228605 A1*   7/2022  Anderson ............... B05B 1/005

OTHER PUBLICATIONS

Seat Ventilation Blowers, Delta Fans and Thermal Management Products, Delta Electronics Inc., https://www.delta-fan.com, accessed on Mar. 15, 2021, 5 pages.

* cited by examiner

VENTILATED SEAT SYSTEM

FIELD OF THE DISCLOSURE

The present disclosure generally relates to a ventilated seat system. More specifically, the present disclosure relates to a ventilated seat system for a vehicle.

BACKGROUND OF THE DISCLOSURE

Vehicles often have a heating, ventilation, and air conditioning (HVAC) system. The HVAC system may be used for heating and cooling a vehicle interior. Generally, the HVAC system directs air through vents arranged around the vehicle.

SUMMARY OF THE DISCLOSURE

According to at least one aspect of the present disclosure, a vehicle ventilated seat system includes a seatback. A seat base is pivotally coupled to the seatback. A blower is operably coupled to at least one of the seat base and the seatback. The blower has a housing that defines an inlet and an outlet. The blower generates a sound transmission during operation. A metamaterial silencer is coupled to an interior surface of the blower proximate at least one of the inlet and the outlet. The metamaterial silencer defines a repeated pattern and extends across at least a portion of the interior surface. A controller is communicatively coupled to the blower. The controller activates the blower to draw air into the inlet and away from a surface of at least one of the seat base and the seatback and expel the air through the outlet. The metamaterial silencer reduces the sound transmission generated by the blower.

According to another aspect of the present disclosure, a vehicle seating assembly includes a seatback. A seat base is operably coupled to the seatback. A blower is operably coupled to at least one of the seat base and the seatback. The blower includes a housing that defines an airflow path between an inlet and an outlet. A controller is communicatively coupled with the blower. The controller activates the blower. The blower generates a predefined sound transmission when activated. An intake metamaterial silencer is coupled to an interior surface of the blower proximate to the inlet and extends along the airflow path. The intake metamaterial silencer and the housing are constructed of a same material.

According to another aspect of the present disclosure, a ventilated seat system for a vehicle includes a seating assembly including a seatback operably coupled to a seat base. A blower is coupled to the seating assembly. The blower generates a sound transmission when activated. The blower includes a housing defining an inlet and an outlet. A first metamaterial silencer is coupled to an interior surface of the housing proximate to the inlet, and a second metamaterial silencer is coupled to the interior surface of the housing proximate to the outlet. Each of the first metamaterial silencer and the second metamaterial silencer reduces the sound transmission generated by the blower.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Additional features and advantages of the presently disclosed device will be set forth in the detailed description which follows and will be apparent to those skilled in the art from the description, or recognized by practicing the device as described in the following description, together with the claims and appended drawings.

Figure 1:
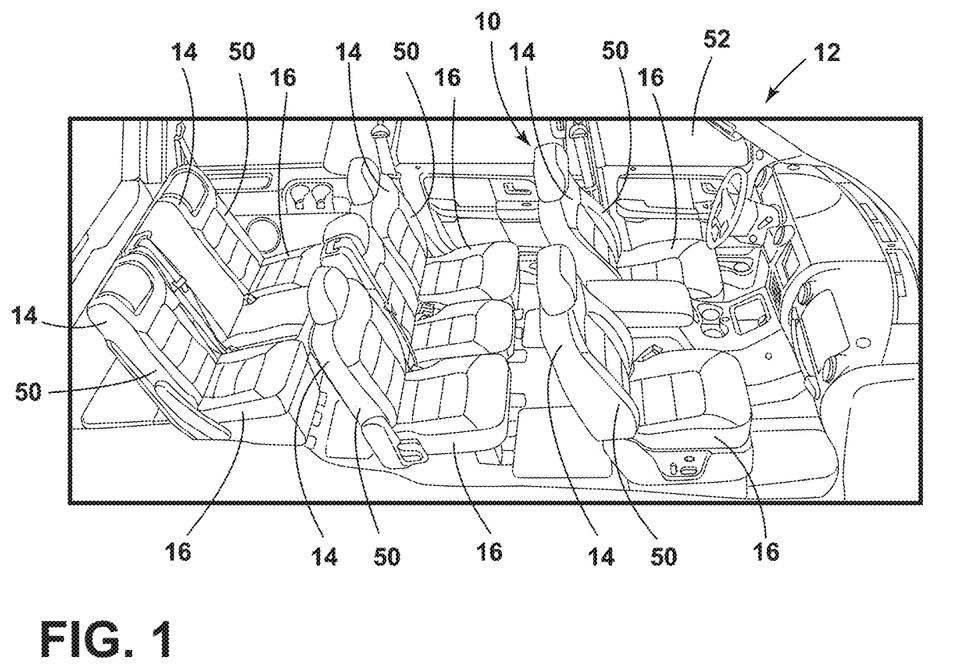
FIG. 1 is a side perspective view of seating assemblies disposed on a passenger cabin of a vehicle, according to the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-12 reference numeral 10 generally designates a ventilated seat system for a vehicle 12 that includes a seatback 14 and a seat base 16 pivotally coupled to the seatback 14. A blower 18 is operably coupled to at least one of the seat base 16 and the seatback 14. The blower 18 has a housing 20 that defines an inlet 22 and an outlet 24. The blower 18 produces or generates a sound transmission during operation. A metamaterial silencer 26 is coupled to an interior surface 28 of the blower 18 proximate to at least one of the inlet 22 and outlet 24. The metamaterial silencer 26 defines a repeated pattern 30 across at least a portion of the interior surface 28. A controller 32 is communicatively coupled to the blower 18. The controller 32 activates the blower 18 to draw air into the inlet 22 and away from the surface 34 of at least one of the seat base 16 and the seatback 14. The blower 18 then expels the air through the outlet 24. The metamaterial silencer 26 reduces the sound transmission generated by the blower.

Referring to FIG. 1, the vehicle 12 includes multiple seating assemblies 50 disposed within the passenger cabin 52. The seating assemblies 50 are generally arranged in multiple rows, with each seating assembly 50 including the seatback 14 and the seat base 16. The ventilated seat system 10 may be utilized to provide thermal comfort to passengers seated on the seating assemblies 50. In conventional thermal comfort systems, a heating, ventilation, and air conditioning (HVAC) system is utilized to heat or cool a vehicle interior. The HVAC system typically heats or cools the entire vehicle interior when activated by providing air through vents arranged in various locations. The ventilated seat system 10 of the present disclosure is utilized to adjust the thermal comfort of the passengers separate from air being directed through the vents. The HVAC system, when used, utilizes enough energy to adjust the temperature of the entire vehicle interior. For certain types of vehicles 12, such as battery electric vehicles 12, energy conservation may be advantageous. The heating and cooling of the individual seating assemblies 50 through the ventilated seat system 10 generally utilizes less energy than the HVAC system.

The vehicle 12 may be a sport utility vehicle, a van, a sedan, a truck, a crossover, other wheeled motor vehicles 12, or other styles of vehicle 12. The vehicle 12 may be a manually operated vehicle 12 (e.g., operated with a human driver), a fully anonymous vehicle 12 (e.g., operated without a human driver), or a partially autonomous vehicle 12 (e.g., operated with or without a human driver). Additionally, the vehicle 12 may be utilized for personal or commercial purposes, such as, transporting, ride providing services (e.g., chauffeuring), or ride-sharing services. Further, the vehicle 12 may be configured as an electric vehicle 12, such as the battery electric vehicle 12, or may include an internal combustion engine.

Figure 2:
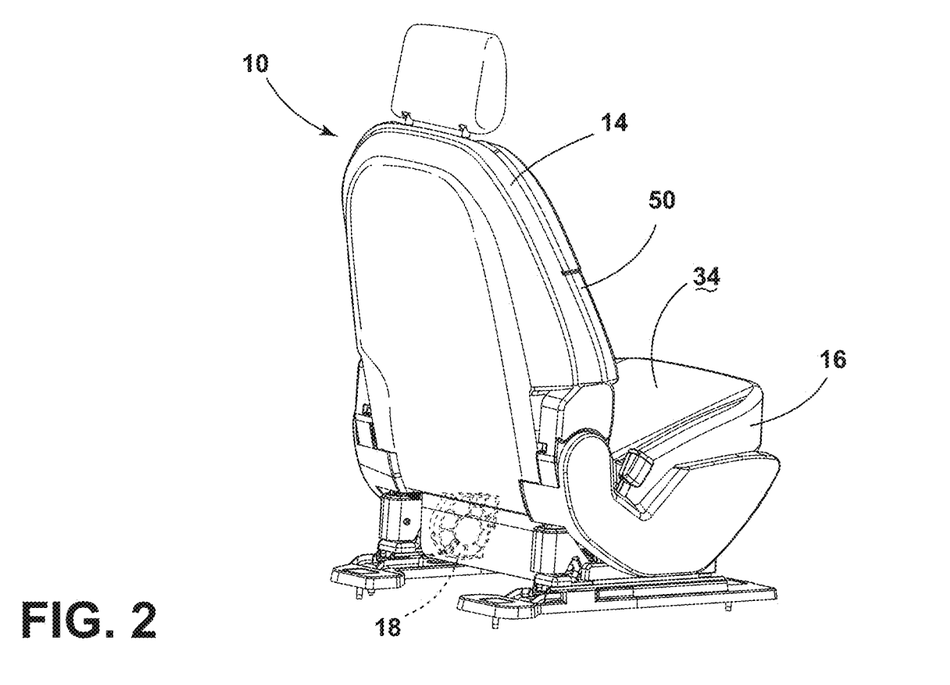
FIG. 2 is a rear perspective view of a seating assembly of a ventilated seat system having a blower, according to the present disclosure.

Referring to FIG. 2, each seating assembly 50 within the ventilated seat system 10 includes the blower 18. The blower 18 is coupled to at least one of the seatback 14 and the seat base 16. In addition to increasing thermal comfort, the ventilated seat system 10 increases sound transmission loss generated by the blower 18. The sound transmission generated by the blower 18 contributes to a noise level within the passenger cabin 52. Reducing the sound transmission generated by the blower 18 increases the comfort of the passenger and an overall user experience. Reducing noise levels may be advantageous particularly for electric vehicles 12 where sound within the passenger cabin 52 (FIG. 1) may be more noticeable without the sound of the internal combustion engine.

Figure 3:
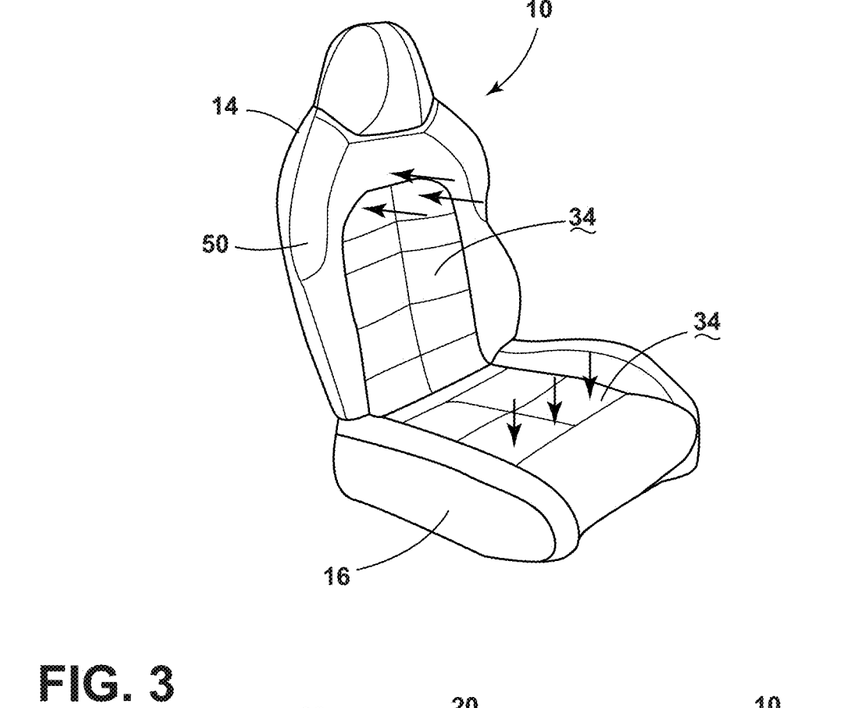
FIG. 3 is a front perspective view of a seating assembly of a ventilated seat system, according to the present disclosure.

Referring to FIG. 2, as well as FIG. 3, the ventilated seat system 10 provides thermal comfort to occupants and passengers through a distributed airflow system. The blower 18 operates to draw air away from the occupant of the seating assembly 50 by drawing air through the surface 34 of the seating assembly 50. The surface 34 may be a support surface of one or both of the seatback 14 and the seat base 16. Generally, the greater the airflow, the faster the thermal comfort for the occupant of the seating assembly 50. There is generally a balance between the speed of the blower 18 during operation relative to the sound transmission (e.g., noise) generated by the blower 18. An increased speed of the blower 18 to provide increased comfort, generally increases the sound transmission generated by the blower 18, yet a slower speed provides reduced thermal comfort.

Figure 4:
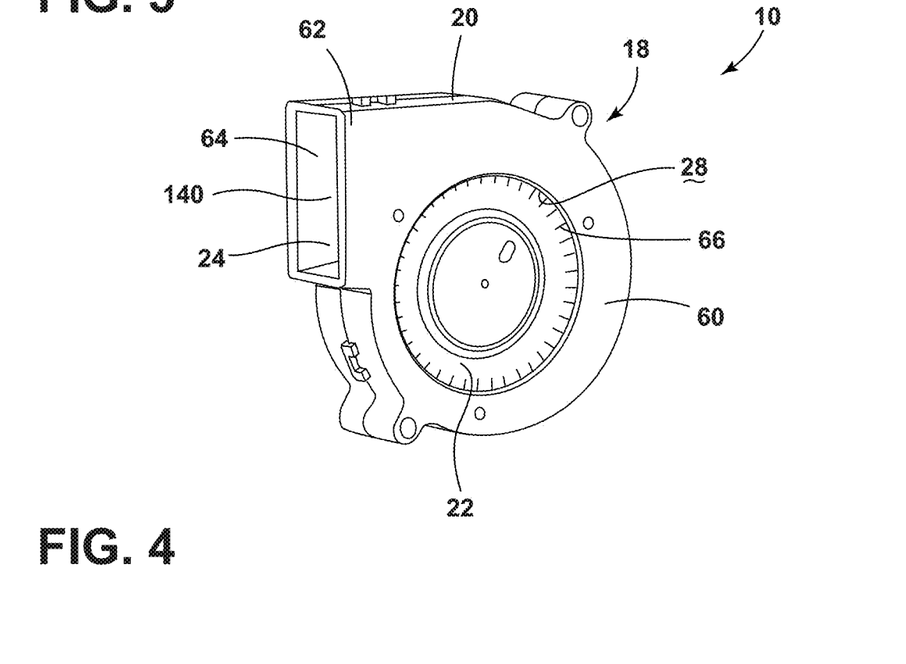
FIG. 4 is a side perspective view of a seat blower of a ventilated seat system, according to the present disclosure.

Referring to FIG. 4, the blower 18 includes a housing 20 that defines the inlet 22 and outlet 24. The housing 20 includes a first portion 60, which defines the inlet 22, and a second portion 62, which defines the outlet 24. Generally, the first portion 60 is rounded having a circular or oblong cross-sectional shape. The second portion 62 extends from the first portion 60 and has a generally square or rectangular cross-sectional shape. An airflow path 64 is defined from the inlet 22 to the outlet 24, drawing air away from the seating assembly 50 (FIG. 2).

Figure 5:
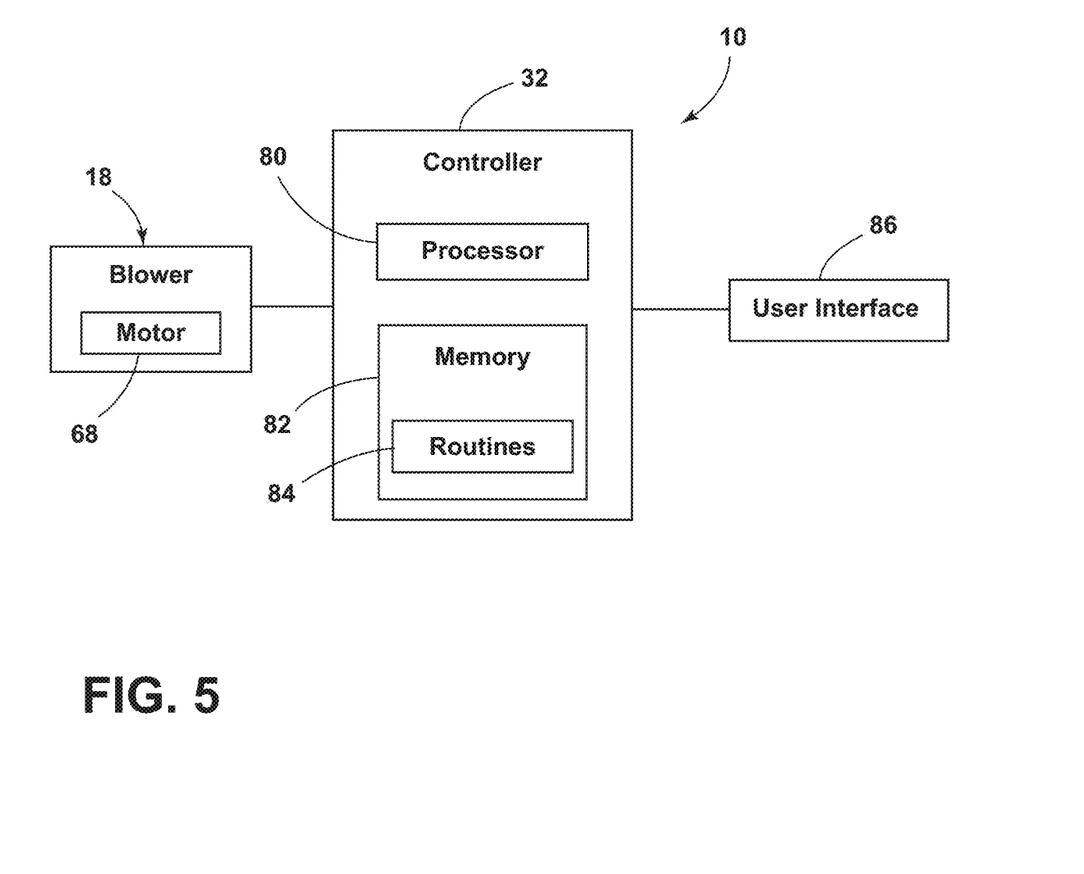
FIG. 5 is a block diagram of a ventilated seat system, according to the present disclosure.

Referring still to FIG. 4, as well as FIG. 5, the blower 18 may be configured as a brushless fan. Generally, in the ventilated seat system 10, the blower 18 operates to pull air, drawing the air away from the occupant. However, the blower 18 may be utilized to push air without departing from the teachings herein. In the illustrated example of FIG. 4, the blower 18 includes an impeller 66 operably coupled with a motor 68. The blower 18 may operate at a predefined maximum speed (in RPM) to provide thermal comfort to the passenger, while generating the sound transmission. The predefined maximum speed may depend on the configuration of the blower 18.

Referring to FIG. 5, the controller 32 is communicatively coupled with the blower 18. The controller 32 includes a processor 80, a memory 82, and other control circuitry. Routines 84 are stored within the memory 82 and executable by the processor 80. The controller 32 is also communicatively coupled with a user interface 86. The user interface 86 may be a touchscreen, buttons, switches, dials, or other selectable features. Generally, the user interface 86 is associated with the control panel of the vehicle 12, such as a control panel in a center stack. The passenger may activate, deactivate, or modify the function of the ventilated seat system 10, and consequently the blower 18, through the user interface 86. After receiving a control signal from the user interface 86, the controller 32 sends a signal to the blower 18 to adjust the function of the blower 18.

Figure 6:
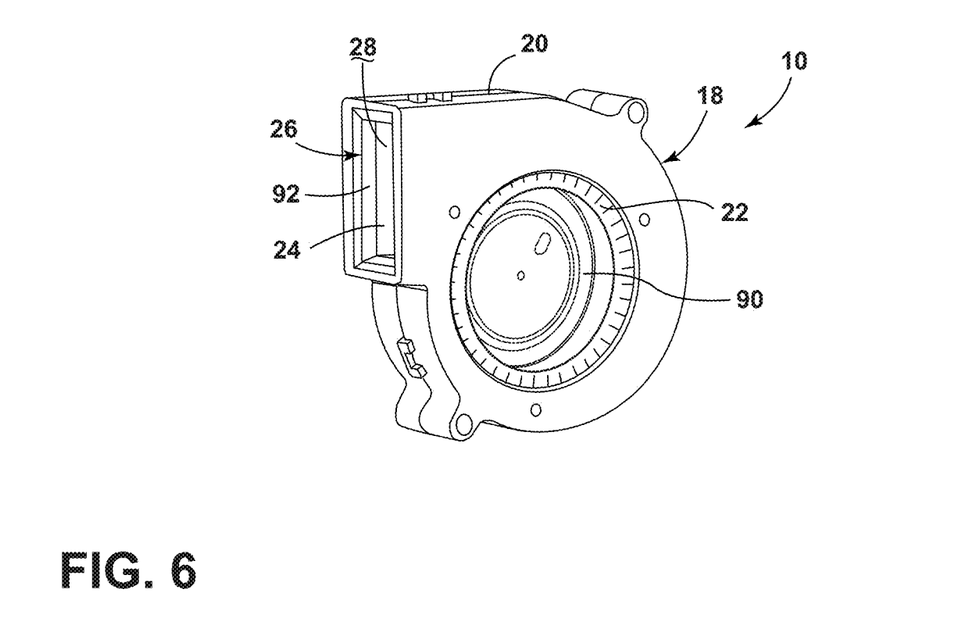
FIG. 6 is a side perspective view of a seat blower of a ventilated seat system with an intake metamaterial silencer and an exhaust metamaterial silencer, according to the present disclosure.

Referring to FIG. 6, when activated by the controller 32 (FIG. 6), the blower 18 generates the sound transmission. The metamaterial silencer 26 is coupled to the housing 20 of the blower 18 to reduce the sound transmission generated by the blower 18 during operation. The blower 18 may include one or both of an intake silencer 90 coupled to the housing 20 proximate to the inlet 22 and an exhaust silencer 92 coupled to the housing 20 proximate to the outlet 24. The intake silencer 90 and the exhaust silencer 92 are collectively referred to herein as the metamaterial silencers 26. The metamaterial silencers 26 increase sound transmission loss, while not substantially impacting airflow through the blower 18, package size of the blower 18, or manufacturing cost.

Metamaterials are generally materials that are engineered to have a specific property that is not natural properties of the materials. The specific properties of the metamaterials may depend on the structure or geometry of the material composition as well as material properties. In the present disclosure, the metamaterial silencers 26 reflect, absorb, cancel, or otherwise prevent the sound transmission from exiting the blower 18 and entering the passenger cabin 52 (FIG. 1).

In the illustrated configuration, the metamaterial silencers 26 are coupled to the interior surface 28 of the housing 20 along the airflow path 64 to reduce the sound transmission. The intake silencer 90 may extend around a perimeter of the inlet 22 and the exhaust silencer 92 may extend around a perimeter of the outlet 24. Each of the intake and exhaust silencers 90, 92 may extend partially or entirely along the perimeter of the airflow path 64 within the blower 18. For example, the exhaust silencer 92 may extend along the perimeter of the outlet 24 and, consequently, along the outside perimeter of the airflow path 64.

Referring to FIGS. 7-12, the metamaterial silencers 26 have a structure or configuration that defines the repeated pattern 30. The repeated pattern 30 may be a textured surface 100, a repeated structure 102, a periodic structure 104, or a combination thereof. The repeated pattern 30 extends along at least a portion of the interior surface 28 to reduce the sound transmission.

Figure 7:
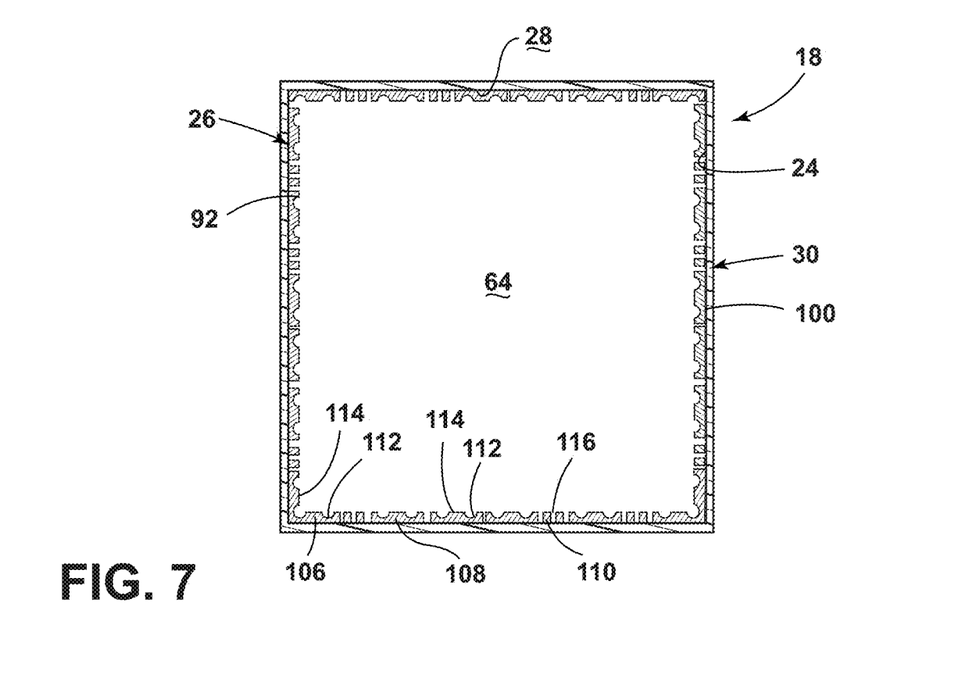
FIG. 7 is a cross-sectional view of an exhaust metamaterial silencer coupled to a housing of a seat blower, according to the present disclosure.

Referring still to FIG. 7, an exemplary metamaterial silencer 26 is illustrated proximate to the outlet 24 of the blower 18. The repeated pattern 30 forms the textured surface 100 that extends along the interior surface 28 of the housing 20. The textured surface 100 includes three substructures 106, 108, 110. The first substructure 106 is disposed in corners and includes multiple grooves 112 and plateaus 114. The second substructure 108 is similar to the first substructure 106 and includes the grooves 112 and the plateaus 114. The second substructure 108 extends linearly along the interior surface 28 and does not curve or bend in a corner. The third of substructure 110 form walls 116 and does not include the grooves 112. The substructures 106, 108, 110 may be spaced apart from the adjacent substructure 106, 108, 110. The substructures 106, 108, 110 are arranged to form the repeated pattern 30 extending around the airflow path 64. It is contemplated that the metamaterial silencer 26 may extend partially around the airflow path 64 without departing from the teachings herein.

Figure 8:
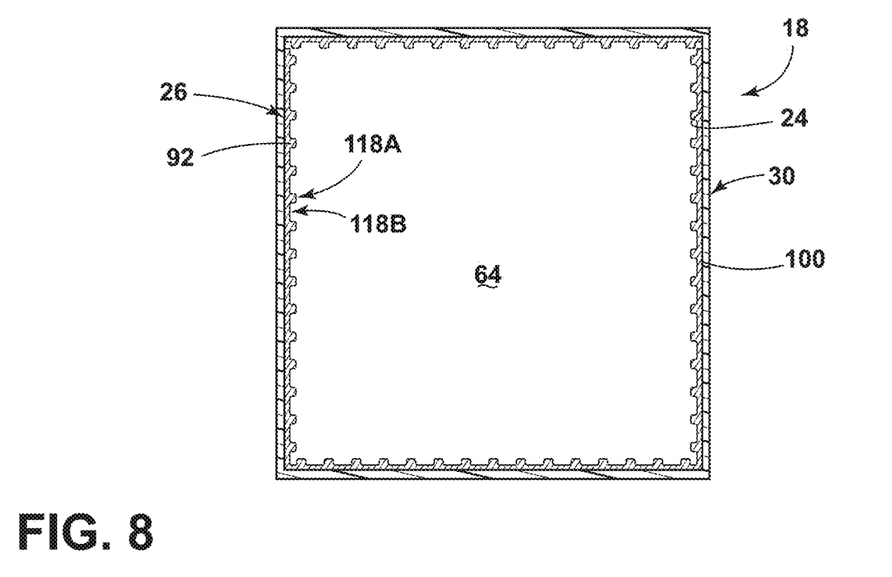
FIG. 8 is representative of a textured surface of a metamaterial silencer for a seat blower, according to the present disclosure.
Figure 9:
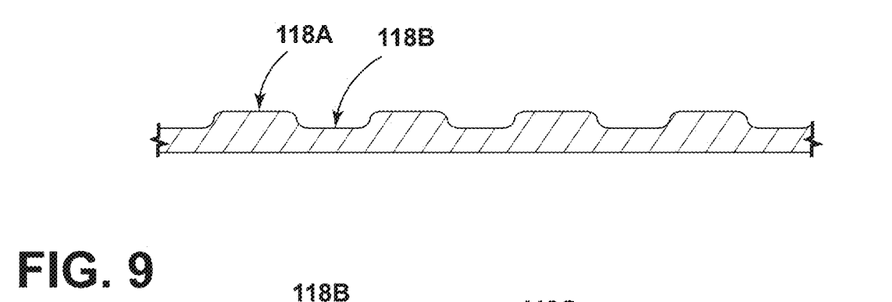
FIG. 9 is representative of a textured surface of a metamaterial silencer for a seat blower, according to the present disclosure.
Figure 10:
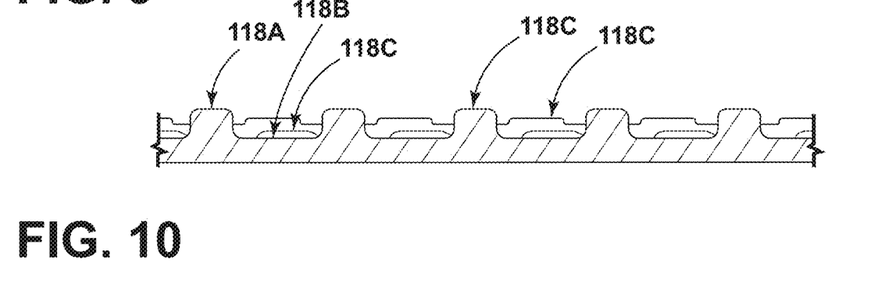
FIG. 10 is representative of a textured surface of a metamaterial silencer for a seat blower, according to the present disclosure.
Figure 11:
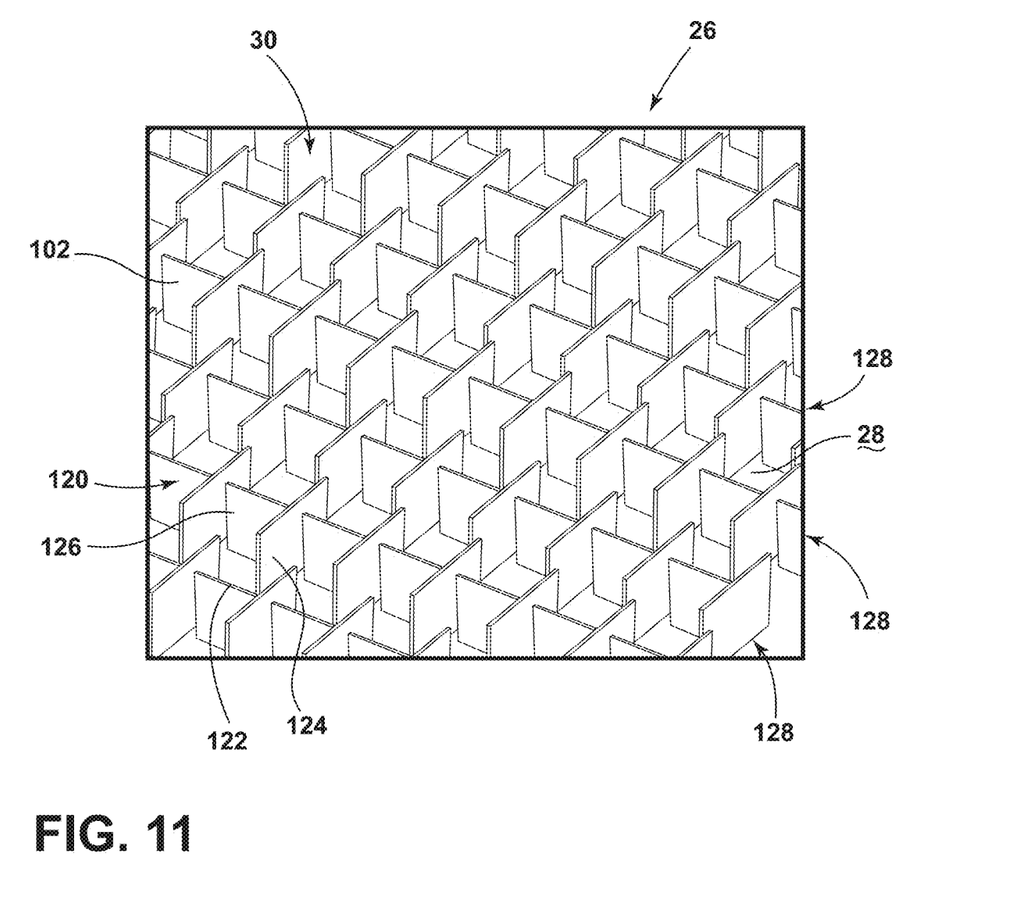
FIG. 11 is representative of a repeated structure of a metamaterial silencer for a seat blower, according to the present disclosure.
Figure 12:
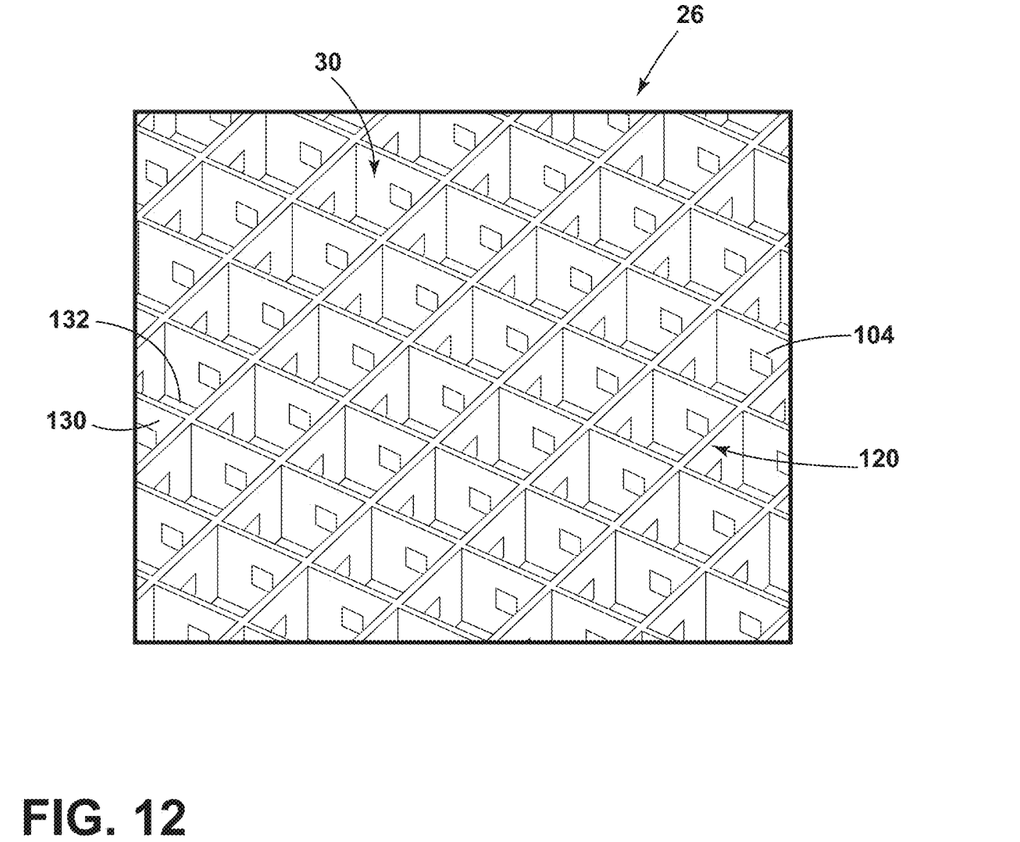
FIG. 12 is representative of a periodic structure of a metamaterial silencer for a seat blower, according to the present disclosure.

Referring still to FIGS. 8-10, additional metamaterial silencer 26 configurations are illustrated that include additional or alternative textured surfaces 100. The textured surface 100 generally includes a periodic pattern of repeated shapes or structures 118A connected to one another to form a grid-like design. The repeated structures 118A may be any geometric, such as rectangles or hemispheres, or non-geometric shapes. The repeated structures 118A may be connected by, for example, connecting walls 118B. The connecting walls 118B generally have a lesser height than the repeated structures 118A relative to the interior surface 140 of the blower 18.

The repeated structures 118A may be arranged in any number of rows 118C and/or columns. It is contemplated that the repeated structures 118A in a first row 118C may be offset from the repeated structures 118A in an adjacent row 118C. It is also contemplated that the textured surface 100 may include the repeated structures 118A without the connecting walls 118B, such that the repeated structures 118A extend from the interior surface 28 at intervals. Further, it is contemplated that the repeated structure 118A and/or the connecting walls 118B may have different configurations in different rows 118C or columns.

The different configurations of the textured surfaces 100 (e.g., the shape of the repeated structures 118A and connecting walls 118B) may correspond to different bands of frequencies for which propagation of waves are affected or impeded. Changing the textured surface 100 may change the frequency range and/or the size of the frequency range of the sound transmission impeded by the textured surface 100. It is contemplated that changing the shape of the textured surface 100 and the shape of space defined by the textured surface 100 (e.g., the space between adjacent structures 118A) may affect the frequency impeded by the textured surface 100. Other textured surfaces 100 may be utilized without departing from the teachings herein.

Referring again to FIG. 11, an exemplary configuration of the repeated pattern 30 configured as the repeated structure 102 is illustrated. The repeated structure may include a plurality of walls 120 that extend from the interior surface 28. In the illustrated example, the repeated structure 102 includes a single substructure 122 having a first wall 124 extending in a first direction and a second wall 126 extending in a second opposing direction. Generally, an end of the second wall 126 is aligned with, and may be coupled to, a center of the first wall 124. The substructures 122 are arranged in rows 128. Each row 128 is offset such that the first wall 124 of each substructure 122 in the first row 128 is aligned with a center of the second wall 126 of the substructures 122 in the adjacent row 128. Other substructure configurations may be utilized without departing from the teachings herein.

Referring again to FIG. 12, an exemplary configuration of the repeated pattern 30 configured as the periodic structure 104 is illustrated. Generally, periodic structures 104 are substructures 130 that are joined together to form a continuous structure. The substructures 130 are typically substantially identical within the periodic structure 104. In the illustrated example, the walls 120 form a continuous structure defining connected geometric shapes that form cells 132. The walls 120 may be arranged to form any geometric or non-geometric shape in the periodic structure 104 without departing from the teachings herein.

Referring again to FIGS. 7-12, to determine the configuration of the repeated pattern 30, Finite Element Analysis (FEA) tools may be utilized for a multidisciplinary design optimization (MDO) study to minimize pressure drop while maximizing the sound transmission reduction. A resulting Pareto curve from the MDO study provides a set of textures and structures of the repeated pattern 30 with varying responses that may be applied to the blower 18.

The metamaterial silencer 26 forms the repeated pattern 30 that extends across the interior surface 28 of the housing 20. The repeated pattern 30 also extends away from the interior surface 28 and toward an interior 140 of blower 18. The size of the metamaterial silencers 26, including depth into the interior 140 of the blower 18 and area of the interior surface 28 covered, may depend on the blower 18 and the sound transmission to be reduced. Moreover, the depth the metamaterial silencer 26 extends into the interior 140 may not substantially impede airflow through the blower 18.

Each of the intake silencer 90 and the exhaust silencer 92 may define the same or substantially similar repeated pattern 30. Alternatively, the intake silencer 90 may define a different repeated pattern 30 than the exhaust silencer 92. Further, it is contemplated that each of the intake silencer 90 and the exhaust silencer 92 may include a single repeated pattern 30 or multiple configurations of repeated patterns 30 without departing from the teachings herein.

Metamaterials may be substantially material agnostic. Metamaterials, such as the metamaterial silencers 26 included in the blower 18, generally rely on geometry for functionality, however, the material properties may also play a factor in overall performance. The metamaterial silencers 26 are generally constructed of the same materials as the housing 20. Typically, each of the housing 20 and the metamaterial silencers 26 is constructed of plastic materials. In this way, the metamaterial silencer is 26 may be coupled to the housing 20 or integrally formed during a molding process.

The geometry and structure of the repeated pattern 30 may be tailored to the intrinsic properties of the plastic materials of the housing 20. The configuration of the metamaterial silencers 26 may utilize Lame's coefficients, which are related to the mechanical properties of the materials. The equations relating the intrinsic properties of the materials using Lame's coefficients are set forth in Equations (1)-(3) below:

$$p\frac{\partial^2 u_x}{\partial t^2} = \frac{\partial}{\partial x}(\lambda \nabla \cdot u) + \nabla \cdot \left(\mu\left(\nabla u_x + \frac{\partial u}{\partial x}\right)\right), \quad \text{Equation (1)}$$

$$p\frac{\partial^2 u_y}{\partial t^2} = \frac{\partial}{\partial y}(\lambda \nabla \cdot u) + \nabla \cdot \left(\mu\left(\nabla u_y + \frac{\partial u}{\partial y}\right)\right), \quad \text{Equation (2)}$$

$$p\frac{\partial^2 u_z}{\partial t^2} = \frac{\partial}{\partial z}(\lambda \nabla \cdot u) + \nabla \cdot \left(\mu\left(\nabla u_z + \frac{\partial u}{\partial z}\right)\right), \quad \text{Equation (3)}$$

where $\rho$ is the material density, $\gamma$ and $\mu$ are Lame's coefficients, $u=[u_x, u_y, u_z]$ is the displacement vector and $u_x$, $u_y$, $u_z$ its Cartesian components. Utilizing the material properties and the sound transmission to be reduced, the configuration or design of the metamaterial silencer 26 may be adjusted.

Referring again to FIGS. 7-12, the metamaterial silencers 26 are utilized to reduce the sound transmission generated by the blower 18 during operation. The metamaterial silencers 26 may be adjusted to target specific frequencies and ranges of maximum operating speed to increase the sound transmission loss by a predefined percentage. The sound transmission generated by the blower 18 is generally in a range of about 50 dBA to about 55 dBA. The predefined reduction percentage may be up to about 20%, measured in dBA. In certain aspects, the metamaterial silencers 26 may reduce the sound transmission by about 4 dBA at a specific frequency range to increase airflow by about 5 CFM.

The blower 18 without the metamaterial silencer generates a predefined sound transmission, generally between about 50 dBA and about 55 dBA. When adding the intake silencer 90, the sound transmission is reduced by a first reduction value. When the exhaust silencer 92 is included in the blower 18, the sound transmission is reduced by a second reduction value. Additionally, when both the intake and exhaust silencers 90, 92 are utilized with the blower 18, the sound transmission is reduced by a third reduction value. Each of the first, second, and third reduction values may be, for example, a reduction up to about 10 dBA. It is contemplated that one or more of the first, second, and third reduction values may be substantially similar or may all be different. The use of the intake silencer 90 may result in a greater sound transmission reduction than the use of the exhaust silencer 92. Further, the use of the intake and exhaust silencers 90, 92 may provide the greatest reduction in sound transmission. In certain aspects, the use of one or both metamaterial silencers 26 may reduce the sound transmission by about 5%. In certain aspects, the use of one or both metamaterial silencers 26 may reduce the sound transmission in a range between about 5% and about 20% relative to the sound transmission generated by the blower 18 without the metamaterial silencers 26. The sound transmission reduction may be adjusted in response to the structure and material of the metamaterial silencers 26.

Use of the present device may provide for a variety of advantages. For example, the ventilated seat system 10 increases the thermal comfort of passengers within the vehicle 12. Also, the ventilated seat system 10 uses less energy than the traditional HVAC heating/cooling option. Additionally, the use of the metamaterial silencer 26 reduces the sound transmission generated by the blower 18 and consequently reduces the noise level within the passenger cabin 52. Further, the blower 18 may include one or both of the intake silencer 90 and exhaust silencer 92. Additionally, the operating speed of the blower 18 may be increased to increase the thermal comfort of the occupants, while reducing the noise level using the metamaterial silencers 26. Moreover, the metamaterial silencers 26 may be constructed of the same materials as the housing 20. Further, no additional noise-dampening materials may be added to the blower 18 when using the metamaterial silencer 26, which may reduce costs and packaging constraints. Also, the metamaterial silencer 26 may allow the size of the blower 18 to be maintained, which may be advantageous for reducing weight and not substantially interfering with the seating assemblies 50. Further, the metamaterial silencers 26 form the repeated pattern 30 with a structure or texture arranged along the interior surface 28 of the housing 20 to absorb, reflect, cancel, or otherwise prevent or reduce the sound transmission generated by the blower 18. Additional benefits or advantages may be realized and/or achieved.

According to various examples, a vehicle ventilated seat system includes a seatback. A seat base is pivotally coupled to the seatback. A blower is operably coupled to at least one of the seat base and the seatback. The blower has a housing that defines an inlet and an outlet. The blower generates a sound transmission during operation. A metamaterial silencer is coupled to an interior surface of the blower proximate at least one of the inlet and the outlet. The metamaterial silencer defines a repeated pattern and extends across at least a portion of the interior surface. A controller is communicatively coupled to the blower. The controller activates the blower to draw air into the inlet and away from a surface of at least one of the seat base and the seatback and expel the air through the outlet. The metamaterial silencer reduces the sound transmission generated by the blower. Embodiments of the present disclosure may include one or a combination of the following features:

the housing includes a first portion that defines the inlet and a second portion that defines the outlet, wherein the second portion has a rectangular cross-sectional shape, and wherein the metamaterial silencer extends along the interior surface of the second portion and along a perimeter of the outlet;

the repeated pattern includes a least one of a textured surface, a repeated structure, and a periodic structure;

the periodic structure includes a plurality of walls forming geometric shapes, and wherein the plurality of walls extend from the interior surface toward an interior of the housing;

the periodic structure includes a first substructure having a first wall and a second wall and a second substructure having a third wall and a fourth wall, wherein the first and third walls extend in a first direction and the second and fourth walls extend in a second opposing direction;

an end of the first wall aligns with a center of the second wall, and wherein an end of the second wall aligns with a center of the third wall; and the textured surface includes multiple connected substructures.

According to various examples, a vehicle seating assembly includes a seatback. A seat base is operably coupled to the seatback. A blower is operably coupled to at least one of the seat base and the seatback. The blower includes a housing that defines an airflow path between an inlet and an outlet. A controller is communicatively coupled with the blower. The controller activates the blower. The blower generates a predefined sound transmission when activated. An intake metamaterial silencer is coupled to an interior surface of the blower proximate to the inlet and extends along the airflow path. The intake metamaterial silencer and the housing are constructed of a same material. Embodiments of the present disclosure may include one or a combination of the following features:

an exhaust metamaterial silencer disposed proximate to the outlet and extending along the airflow path;

the housing and the exhaust metamaterial silencer are constructed of the same material;

the exhaust metamaterial silencer extends along an entire perimeter of the airflow path;

the housing is constructed of a plastic material;

the intake metamaterial silencer includes a plurality of walls extending from the interior surface of the housing into an interior of the housing;

the plurality of walls form a repeated pattern;

the plurality of walls are coupled together to form repeated shapes; and the intake metamaterial silencer reduces the predefined sound transmission generated by the blower by at least 5%.

According to various examples, a ventilated seat system for a vehicle includes a seating assembly including a seatback operably coupled to a seat base. A blower is coupled to the seating assembly. The blower generates a sound transmission when activated. The blower includes a housing defining an inlet and an outlet. A first metamaterial silencer is coupled to an interior surface of the housing proximate to the inlet, and a second metamaterial silencer is coupled to the interior surface of the housing proximate to the outlet. Each of the first metamaterial silencer and the second metamaterial silencer reduces the sound transmission generated by the blower. Embodiments of the present disclosure may include one or a combination of the following features:

each of the first metamaterial silencer and the second metamaterial silencer defines a periodic structure that extends from the interior surface of the housing;

the first metamaterial silencer defines a first periodic structure and the second metamaterial silencer defines a second periodic structure, wherein each of the first periodic structure and the second periodic structure extends from the interior surface of the housing; and each of the housing, the first metamaterial silencer, and the second metamaterial silencer are constructed of a plastic material.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

The various illustrative logical blocks, modules, controllers, and circuits described in connection with the embodiments disclosed herein may be implemented or performed with application specific integrated circuits (ASICs), field programmable gate arrays (FPGAs), general purpose processors, digital signal processors (DSPs) or other logic devices, discrete gates or transistor logic, discrete hardware components, or any combination thereof designed to perform the functions described herein. A general purpose processor may be any conventional processor, controller, microcontroller, state machine or the like. A processor may also be implemented as a combination of computing devices, e.g., a combination of a DSP and a microprocessor, a plurality of microprocessors, one or more microprocessors in conjunction with a DSP core, or any other such configuration.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle ventilated seat system, comprising:
a seatback;
a seat base pivotally coupled to the seatback;
a blower operably coupled to at least one of the seat base and the seatback, wherein the blower has a housing including a first portion that defines an inlet and a second portion that defines an outlet, wherein the second portion has a rectangular cross-sectional shape, and wherein the blower generates a sound transmission during operation;
a metamaterial silencer coupled to an interior surface of the blower proximate at least one of the inlet and the outlet, wherein the metamaterial silencer defines a repeated pattern and extends across at least a portion of the interior surface, and wherein the metamaterial silencer extends along the interior surface of the second portion and along a perimeter of the outlet; and
a controller communicatively coupled to the blower, wherein the controller activates the blower to draw air into the inlet and away from a surface of at least one of the seat base and the seatback and expel the air through the outlet, wherein the metamaterial silencer reduces the sound transmission generated by the blower.

2. The vehicle ventilated seat system of claim 1, wherein the repeated pattern includes a least one of a textured surface, a repeated structure, and a periodic structure.

3. The vehicle ventilated seat system of claim 2, wherein the periodic structure includes a plurality of walls forming geometric shapes, and wherein the plurality of walls extend from the interior surface toward an interior of the housing.

4. The vehicle ventilated seat system of claim 2, wherein the periodic structure includes a first substructure having a first wall and a second wall and a second substructure having a third wall and a fourth wall, wherein the first and third walls extend in a first direction and the second and fourth walls extend in a second opposing direction.

5. The vehicle ventilated seat system of claim 4, wherein an end of the first wall aligns with a center of the second wall, and wherein an end of the second wall aligns with a center of the third wall.

6. The vehicle ventilated seat system of claim 2, wherein the textured surface includes multiple connected substructures.

7. A vehicle seating assembly, comprising:
a seatback;
a seat base operably coupled to the seatback;
a blower operably coupled to at least one of the seat base and the seatback, wherein the blower includes a housing defining an airflow path between an inlet and an outlet;
a controller communicatively coupled with the blower, wherein the controller activates the blower, and wherein the blower generates a predefined sound transmission when activated; and
an intake metamaterial silencer coupled to an interior surface of the blower proximate to the inlet and extending along the airflow path, wherein the intake metamaterial silencer and the housing are constructed of a same material.

8. The vehicle seating assembly of claim 7, further comprising:
an exhaust metamaterial silencer disposed proximate to the outlet and extending along the airflow path.

9. The vehicle seating assembly of claim 8, wherein the housing and the exhaust metamaterial silencer are constructed of the same material.

10. The vehicle seating assembly of claim 8, wherein the exhaust metamaterial silencer extends along an entire perimeter of the airflow path.

11. The vehicle seating assembly of claim 7, wherein the housing is constructed of a plastic material.

12. The vehicle seating assembly of claim 7, wherein the intake metamaterial silencer includes a plurality of walls extending from the interior surface of the housing into an interior of the housing.

13. The vehicle seating assembly of claim 12, wherein the plurality of walls form a repeated pattern.

14. The vehicle seating assembly of claim 12, wherein the plurality of walls are coupled together to form repeated shapes.

15. The vehicle seating assembly of claim 7, wherein the intake metamaterial silencer reduces the predefined sound transmission generated by the blower by at least 5%.

16. A ventilated seat system for a vehicle, comprising:
a seating assembly including a seatback operably coupled to a seat base; and
a blower coupled to the seating assembly, wherein the blower generates a sound transmission when activated, wherein the blower includes:
a housing defining an inlet and an outlet;
a first metamaterial silencer coupled to an interior surface of the housing proximate to the inlet; and a second metamaterial silencer coupled to the interior surface of the housing proximate to the outlet, wherein each of the first metamaterial silencer and the second metamaterial silencer reduce the sound transmission generated by the blower.

17. The ventilated seat system of claim 16, wherein each of the first metamaterial silencer and the second metamaterial silencer defines a periodic structure that extends from the interior surface of the housing.

18. The ventilated seat system of claim 16, wherein the first metamaterial silencer defines a first periodic structure and the second metamaterial silencer defines a second periodic structure, wherein each of the first periodic structure and the second periodic structure extends from the interior surface of the housing.

19. The ventilated seat system of claim 16, wherein each of the housing, the first metamaterial silencer, and the second metamaterial silencer is constructed of a plastic material.

\* \* \* \* \*